US007515444B2

(12) United States Patent
Chen

(10) Patent No.: US 7,515,444 B2
(45) Date of Patent: Apr. 7, 2009

(54) CONVERTER WITH SELECTIVE CURRENT MODE AND VOLTAGE MODE CONTROLLED SWITCHING

(75) Inventor: Xiaoping Chen, Buffalo Grove, IL (US)

(73) Assignee: Schumacher Electric Corporation, Mount Prospect, IL (US)

( * ) Notice: Subject to any disclaimer, the term of this patent is extended or adjusted under 35 U.S.C. 154(b) by 309 days.

(21) Appl. No.: 11/590,158

(22) Filed: Oct. 31, 2006

(65) Prior Publication Data

US 2007/0176584 A1    Aug. 2, 2007

Related U.S. Application Data

(60) Provisional application No. 60/732,169, filed on Nov. 1, 2005.

(51) Int. Cl.
*H02M 1/08* (2006.01)

(52) U.S. Cl. ............................. 363/97; 363/26

(58) Field of Classification Search .................. 363/16, 363/26, 95, 97
See application file for complete search history.

(56) References Cited

U.S. PATENT DOCUMENTS

| | | | | |
|---|---|---|---|---|
| 6,320,768 | B1 * | 11/2001 | Pham et al. | .................. 363/41 |
| 2003/0026115 | A1 | 2/2003 | Miyazaki | |
| 2003/0034762 | A1 | 2/2003 | Tareishi | |

(Continued)

*Primary Examiner*—Jeffrey L Sterrett
(74) *Attorney, Agent, or Firm*—John S. Paniaguas; Katten Muchin Rosenman LLP

(57) ABSTRACT

A switched mode converter is disclosed that includes both voltage mode and current mode control. The switched mode converter also includes mode logic for switching between a voltage mode and a current mode. The converter includes current sensing circuitry for sensing the switcher current on the primary side of the transformer and the load current on the secondary side as well as voltage sensing circuitry for sensing the converter output voltage. When the load current is less than a predetermined value, the converter operates in a voltage mode. During the voltage mode, the output voltage of the voltage mode controller is used to control the duty cycle of a pulse width modulation (PWM) controller. When the load current is greater than a predetermined value, the converter operates in a current mode. In a current mode, the primary switcher current is used to control the PWM controller. As such, during a light load in which the converter is voltage controlled, there is no need for a minimum load to stabilize the control loop. In a current-mode, the control loop will have a relatively faster transient response and avoid flux imbalance in push-pull topology. As such, the converter provides the advantages of both known voltage controlled and current controlled switched mode converters. In addition, by the careful arrangement of the locations of a EMC filter, a primary heat sink, a secondary heat sink, a power transformer T1 and other power devices as well as a cooling fan, a smaller EMC filter can be used due to the primary heat sink performing a dual function of thermal management and additionally providing EMC shielding to prevent the noise, for example, the noise generated by the transformer, from reaching the filter. In addition, the primary heat sink is configured to face the air flow while the secondary heat sink is placed close to the fan with its fin direction the same as the direction of the air flow. As such, both the primary and the secondary heat sink get maximum air flow, allowing smaller heat sinks to be used in order to provide a reliable and cost-effective switched mode converter.

1 Claim, 15 Drawing Sheets

U.S. PATENT DOCUMENTS

| | | |
|---|---|---|
| 2003/0090224 A1 | 5/2003 | Gass et al. |
| 2003/0151928 A1 | 8/2003 | Kobori et al. |
| 2004/0263139 A1 | 12/2004 | Goto et al. |
| 2005/0116695 A1 | 6/2005 | Morioka |
| 2005/0212500 A1 | 9/2005 | Bucheru |
| 2005/0219870 A1 | 10/2005 | Yang et al. |
| 2005/0231984 A1 | 10/2005 | Wang et al. |
| 2007/0153553 A1* | 7/2007 | Cebry et al. .................. 363/16 |
| 2008/0192515 A1* | 8/2008 | Huynh et al. ............ 363/21.12 |
| 2008/0259656 A1* | 10/2008 | Grant ...................... 363/21.18 |

* cited by examiner

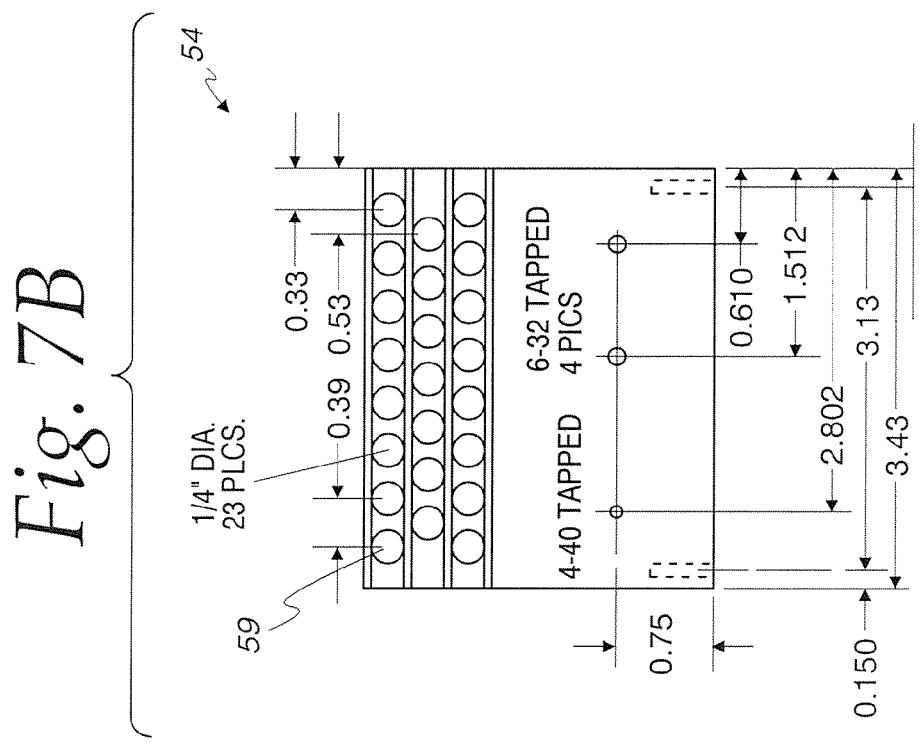
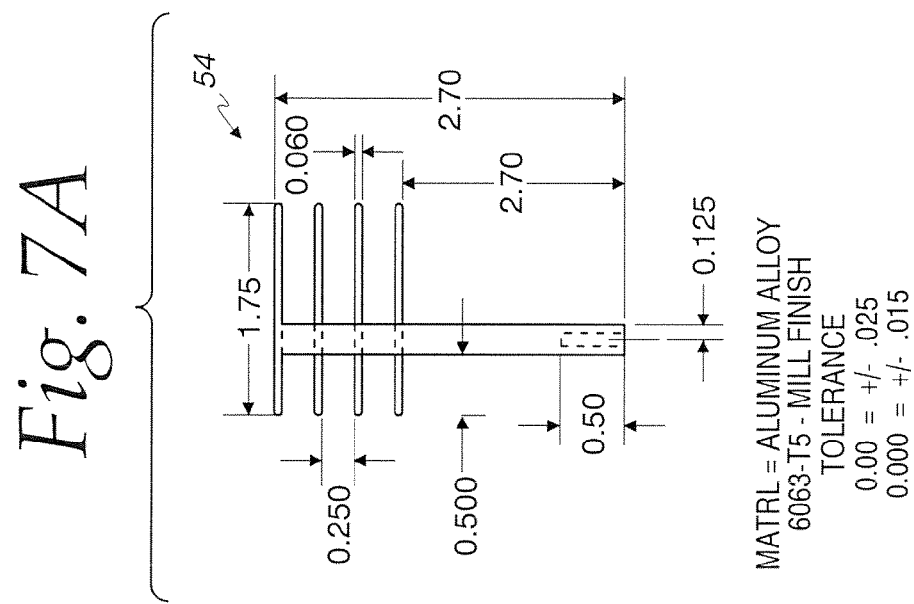

CONVERTER WITH SELECTIVE CURRENT MODE AND VOLTAGE MODE CONTROLLED SWITCHING

CROSS REFERENCE TO RELATED APPLICATIONS

This application claims priority to and the benefit of U.S. provisional patent application Ser. No. 60/732,169, filed on Nov. 1, 2005.

BACKGROUND OF THE INVENTION

1. Field of the Invention

The present invention relates to a switched mode power supply and more particularly to a switched mode power supply that can be used in AC/DC converters and DC/DC converters which incorporates both voltage mode and current mode logic to provide a multi-mode switched mode power supply which optimizes the transient response time and output regulation relative to known switched mode power supplies.

2. Description of the Prior Art

Both linear and switched mode power supplies are known in the art. Such power supplies are normally known as converters and are used to provide a regulated source of DC power to a DC device. AC/DC converters are used to convert an unregulated source of AC power to a regulated source of DC power. DC/DC converters are used to convert an unregulated source of DC power to a regulated source of DC power.

AC linear converters provide linear output power as a function of input power. Such linear converters normally include a step down transformer, a half or full wave rectifier and a voltage regulator. DC linear converters simply include a regulator. Although such linear power supplies are able to provide a fairly stable source of DC electrical power, such power supplies are relatively heavy, bulky and inefficient.

As such, switched mode power supplies have been developed. Such switched mode power supplies normally have lighter weight and are more efficient than linear power supplies. Such switched mode power supplies may include a high frequency transformer, a high frequency switching circuit and a pulse width modulation (PWM) controller for controlling the switching circuit.

A switched mode power supply or converter should maintain its specified performance (i.e regulated output voltage) during any changes in the input source and/or output load. By sensing those changes, the control logic of a converter generates and adjusts a train of high frequency pulses from the PWM controller to regulate the performance of the converter based those changes. Examples of such switched mode converters are disclosed in US Patent Application Publication Nos.: US 2003/0026115 A1; US 2003/0034762 A1; US 2003/0090246; A1; US 2003/0151928 A1; US 2004/0263139 A1; US 2005/0116695; US 2005/0212500 A1; US 2005/0219870 A1; and US 2005/0231984 A1; all hereby incorporated by reference.

Different control circuits are known to be used to control such switched mode converters. Voltage-mode and current-mode control methods are the most popular ones. US Patent Application Publication No. US 2003/00347762 A1 discloses a voltage controlled switched mode converter. In such voltage controlled switched mode converters, the output voltage of the converter is typically sensed and compared with a reference voltage. The difference between the converter output voltage and the reference voltage is used to control the duty cycle of the PWM, which, in turn, is applied to a switching circuit. As such, any changes in the output voltage due to load current and/or input voltage changes are utilized to adjust the PWM width of the drive pulses in order to regulate the output voltage.

Voltage controlled converters are known to have excellent voltage regulation in order to provide a regulated output voltage in response to changes in the input voltage and the output load. Such voltage controlled converters can also maintain good regulation even at no load. Unfortunately, such voltage controlled converters manifest a slow transient response to input and output load changes. Moreover, such voltage controlled converters are generally not suitable for power converters configured with a push-pull topology due to the possible flux imbalance of the high frequency transformer.

As mentioned above, current controlled switched mode converters are also known. US Patent Application Publication US 2004/0263139 discloses such a current controlled switched mode converter. In general, such current controlled switched mode converters include two feedback loops: an outer feedback loop, which senses the DC output voltage and delivers a DC control voltage to an inner loop which senses the peak power switcher current and keeps them constant on a pulse-by-pulse basis. Such current controlled switched mode converter offer many advantages over voltage controlled switched mode converters, such as, solving the flux imbalance problem in converters configured with push-pull topology. Such current controlled switched mode converters also have relatively faster transient response times to both input voltage and output load changes relative to voltage controlled switched mode converters. Finally, such current controlled switched mode converters simplify feedback-loop stabilization relative to voltage controlled switched mode converters.

Unfortunately, such current controlled switched mode converters have relatively poor output regulation compared to voltage controlled switched mode converters, especially during light load conditions. As such, current controlled switched mode converters normally need a fixed minimum load to stabilize the control loop and maintain output regulation during light load conditions. In some applications, such as during conditions when the converter is connected to a battery as a load, the battery may be damaged and lose its recharge capability permanently due to it being discharged to an extreme low voltage for a long time by the minimum load when the input power to the converter is lost.

Another problem with such switched mode converters relates to electromagnetic compatibility (EMC) and thermal management. In particular, even though such switched mode converters are relatively more efficient than linear power supplies, such switched mode converters are noisy due to the switching and thus can result in electromagnetic interference. In addition, in certain applications, such as recreational vehicle (RV) applications, the output power requirements of the such switched mode converter is designed to provide all of the power to the DC loads in an RV vehicle including cabin lighting, furnace fan motors and the like. The power requirement of such loads is relatively substantial. As such, such switched mode converters generate a significant amount of heat that must be dissipated. As such, electromagnetic compatibility (EMC) and thermal management are also very important considerations in the design and implementation of a switched mode converter.

Thus, there is a need to combine the advantages of both the voltage controlled and current controlled switched mode converters to provide a switched mode converter with better performance than a voltage controlled or current controlled switched mode converter individually while at the same time takes into account EMC as well as thermal management.

SUMMARY OF THE INVENTION

Briefly, the present invention relates to a switched mode converter that includes both voltage mode and current mode control. The switched mode converter also includes mode logic for switching between a voltage mode and a current mode. The converter includes current sensing circuitry for sensing the switcher current on the primary side of the transformer and the load current on the secondary side as well as voltage sensing circuitry for sensing the converter output voltage. When the load current is less than a predetermined value, the converter operates in a voltage mode. During the voltage mode, the output voltage of the voltage mode controller is used to control the duty cycle of a pulse width modulation (PWM) controller. When the load current is greater than a predetermined value, the converter operates in a current mode. In a current mode, the primary switcher current is used to control the PWM controller. As such, during a light load in which the converter is voltage controlled, there is no need for a minimum load to stabilize the control loop. In a current-mode, the control loop will have a relatively faster transient response and avoid flux imbalance in push-pull topology. As such, the converter provides the advantages of both known voltage controlled and current controlled switched mode converters. In addition, by the careful arrangement of the locations of a EMC filter, a primary heat sink, a secondary heat sink, a power transformer T1 and other power devices as well as a cooling fan, a smaller EMC filter can be used due to the primary heat sink performing a dual function of thermal management and additionally providing EMC shielding to prevent the noise, for example, the noise generated by the transformer, from reaching the filter. In addition, the primary heat sink is configured to face the air flow while the secondary heat sink is placed close to the fan with its fin direction the same as the direction of the air flow. As such, both the primary and the secondary heat sink get maximum air flow, allowing smaller heat sinks to be used in order to provide a reliable and cost-effective switched mode converter.

DESCRIPTION OF THE DRAWING

These and other advantages of the present invention will be readily understood with reference to the following description and attached drawing, wherein:

FIG. 7A is a side elevational view of an exemplary primary heat sink for use with the present invention.

FIG. 7B is a s front elevational view of the primary heat sink illustrated in FIG. 7A.

DETAILED DESCRIPTION

The present invention relates to a switched mode converter that includes both voltage mode and current mode control. The switched mode converter also includes mode logic for switching between a voltage mode and a current mode to combine the advantages of both current controlled and voltage controlled switched mode converters. The principles of the present invention are applicable to both AC to DC converters as well as DC to DC converters.

Exemplary Block Diagram

Figure 1:
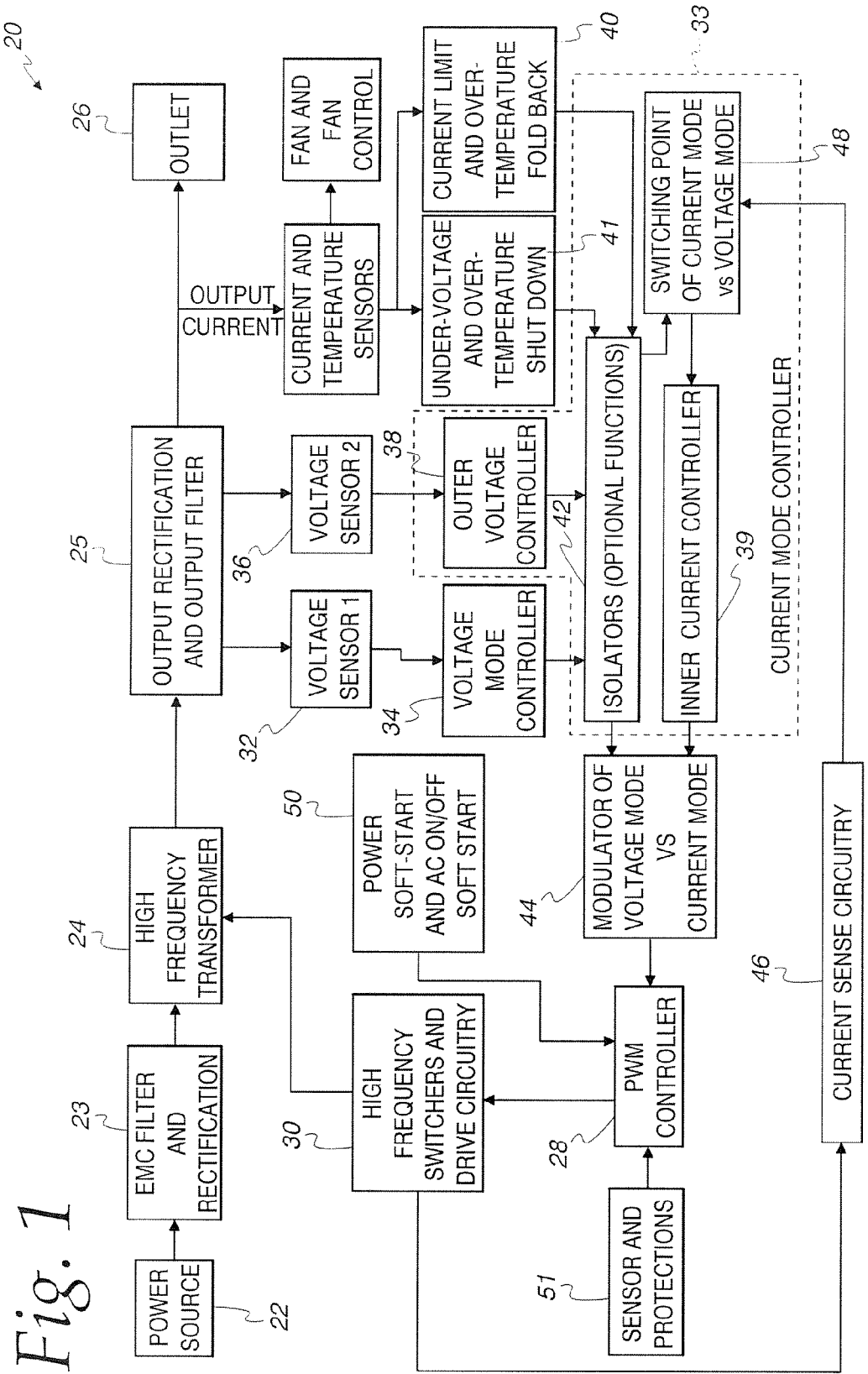
FIG. 1 is a block diagram of the switched mode converter in accordance with the present invention.
Figure 2A:
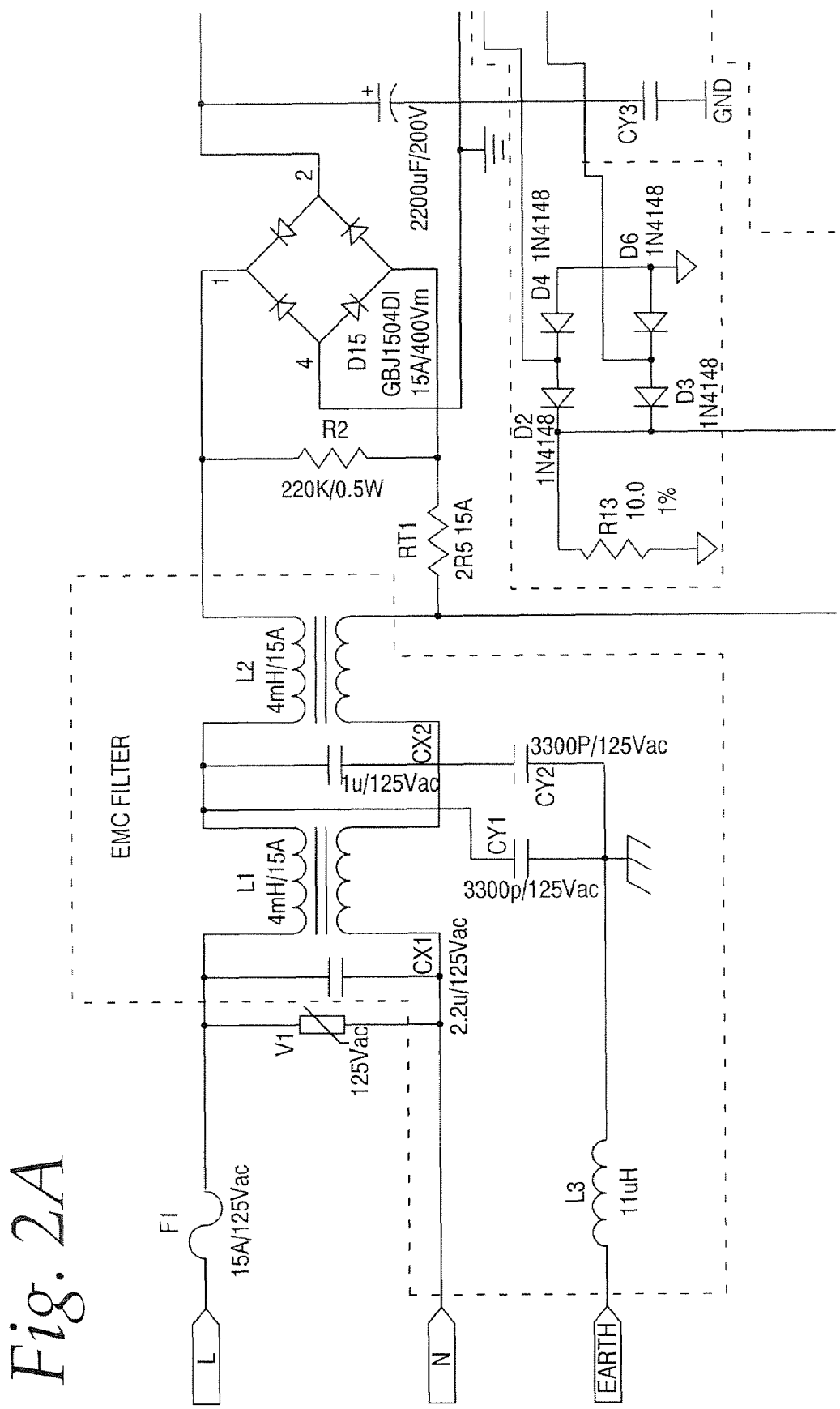
FIG. 2. is a schematic diagram of the switched mode converter illustrated in FIG. 1.
Figure 2B:
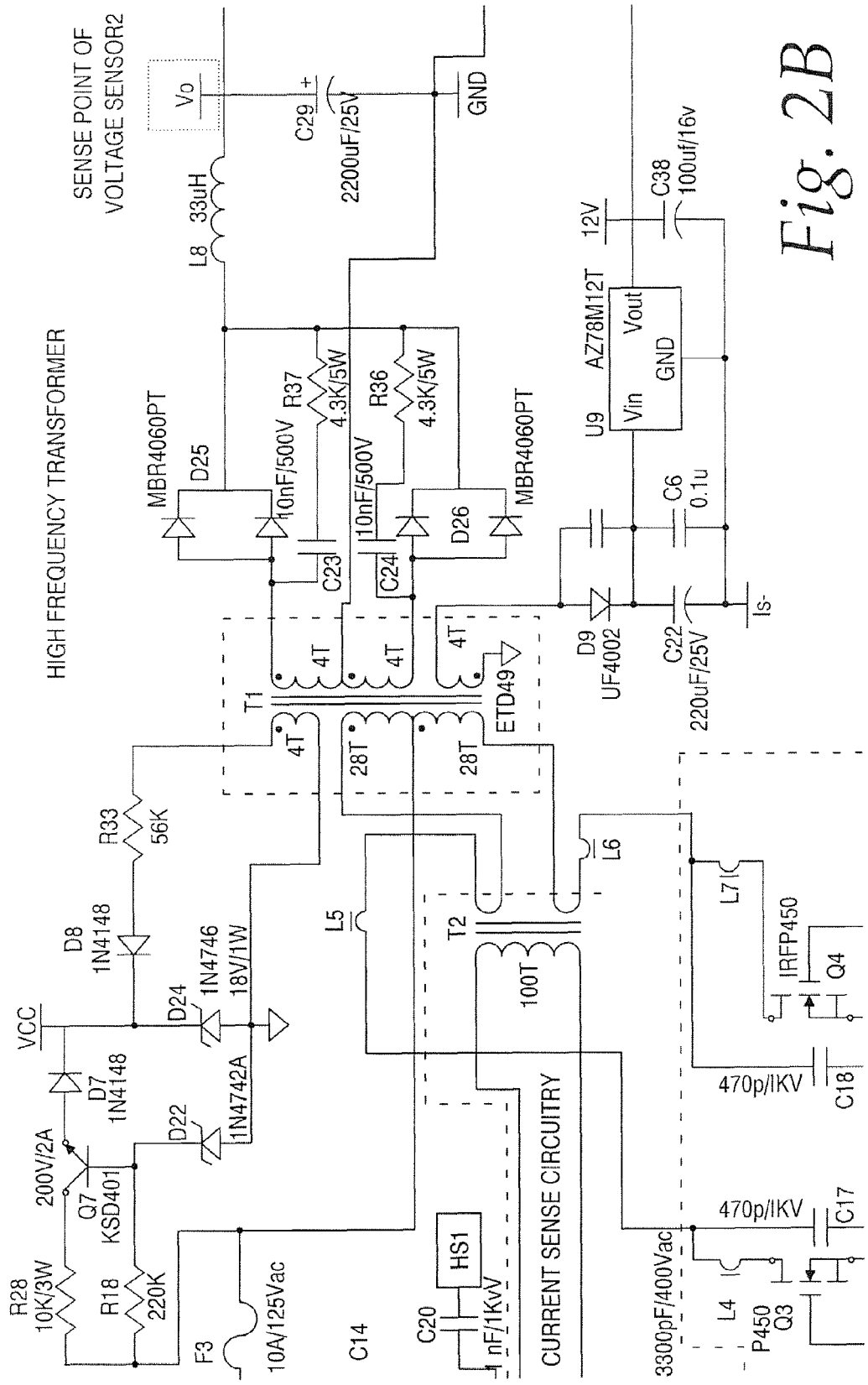
Figure 2C:
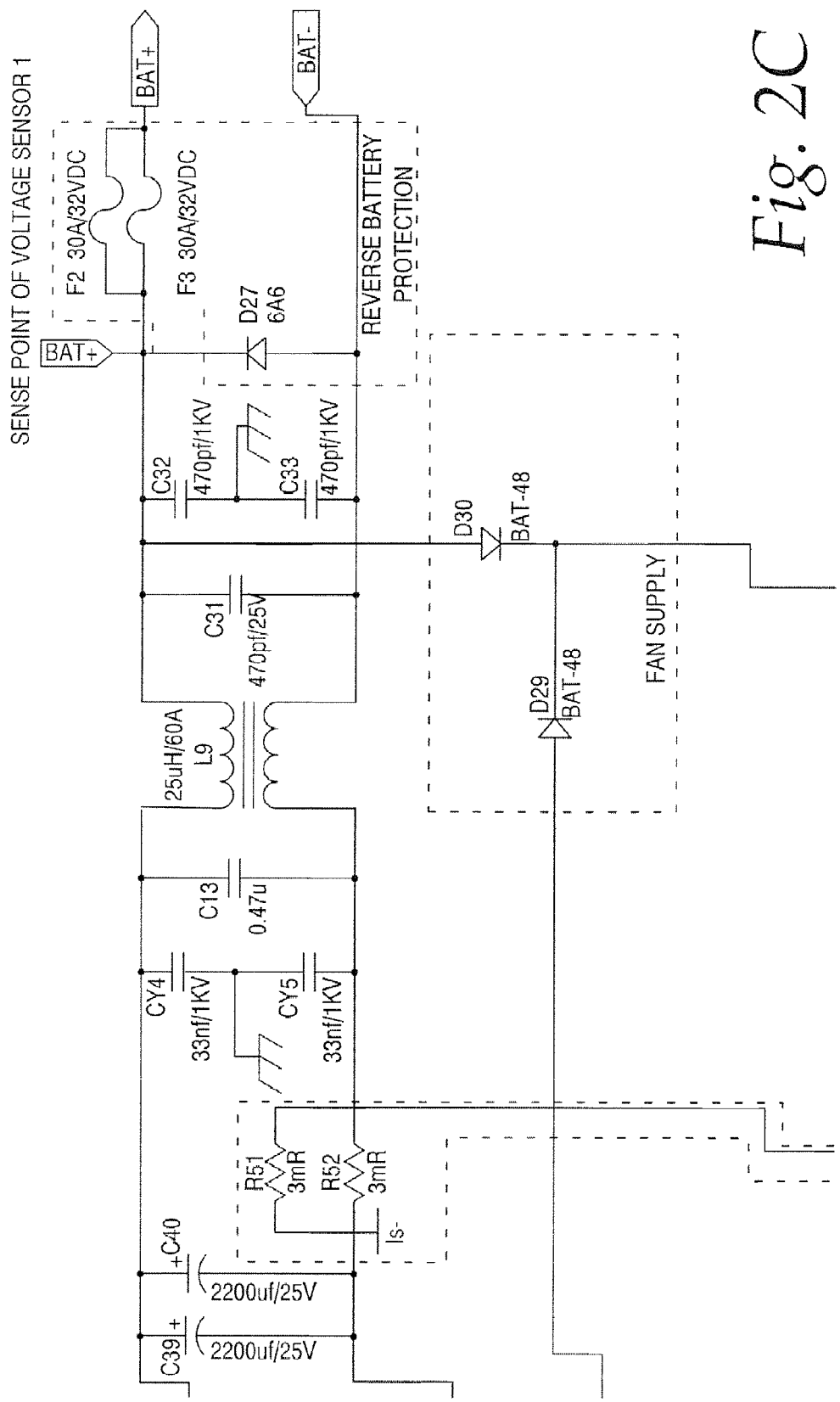
Figure 2D:
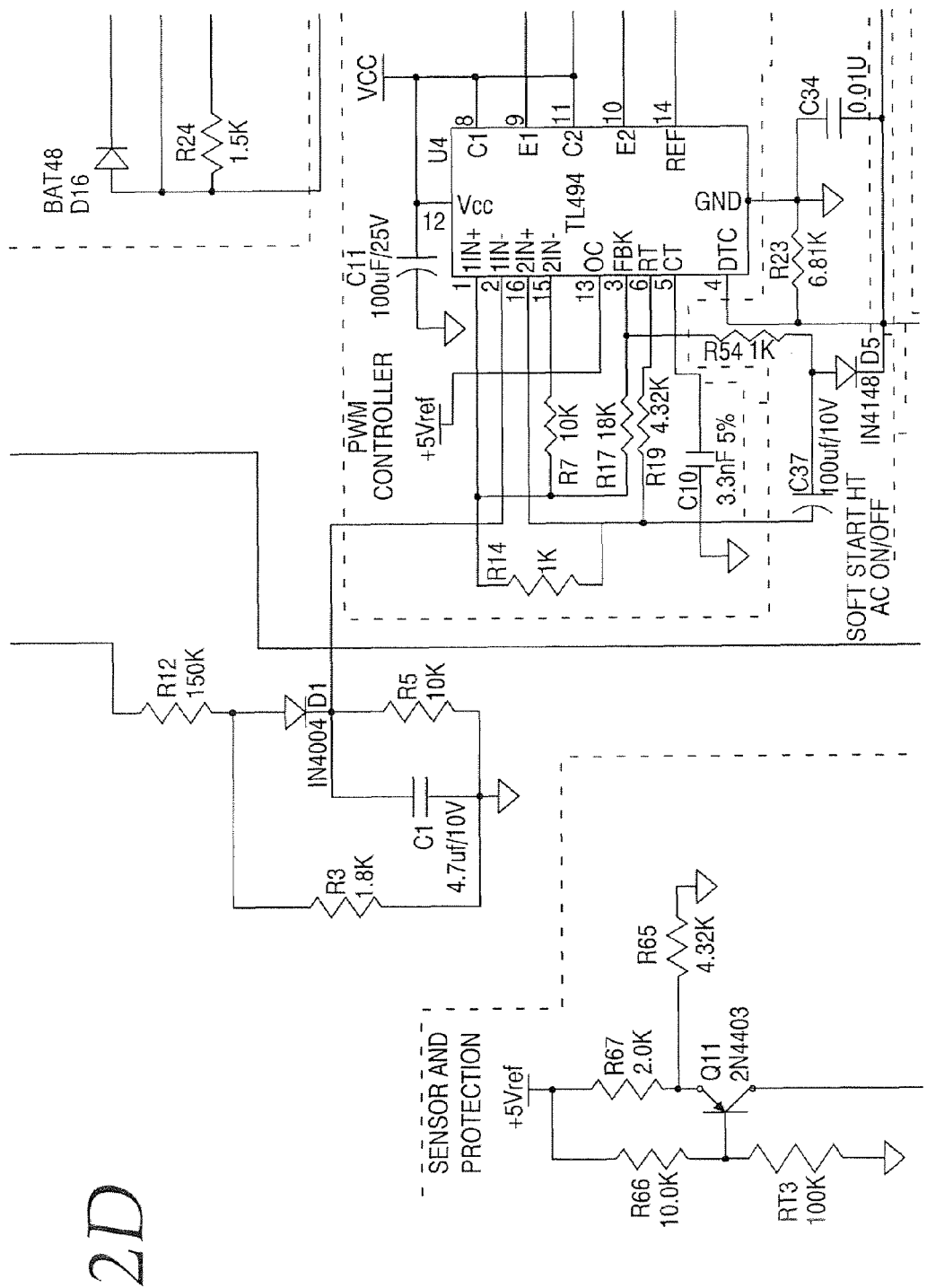
Figure 2E:
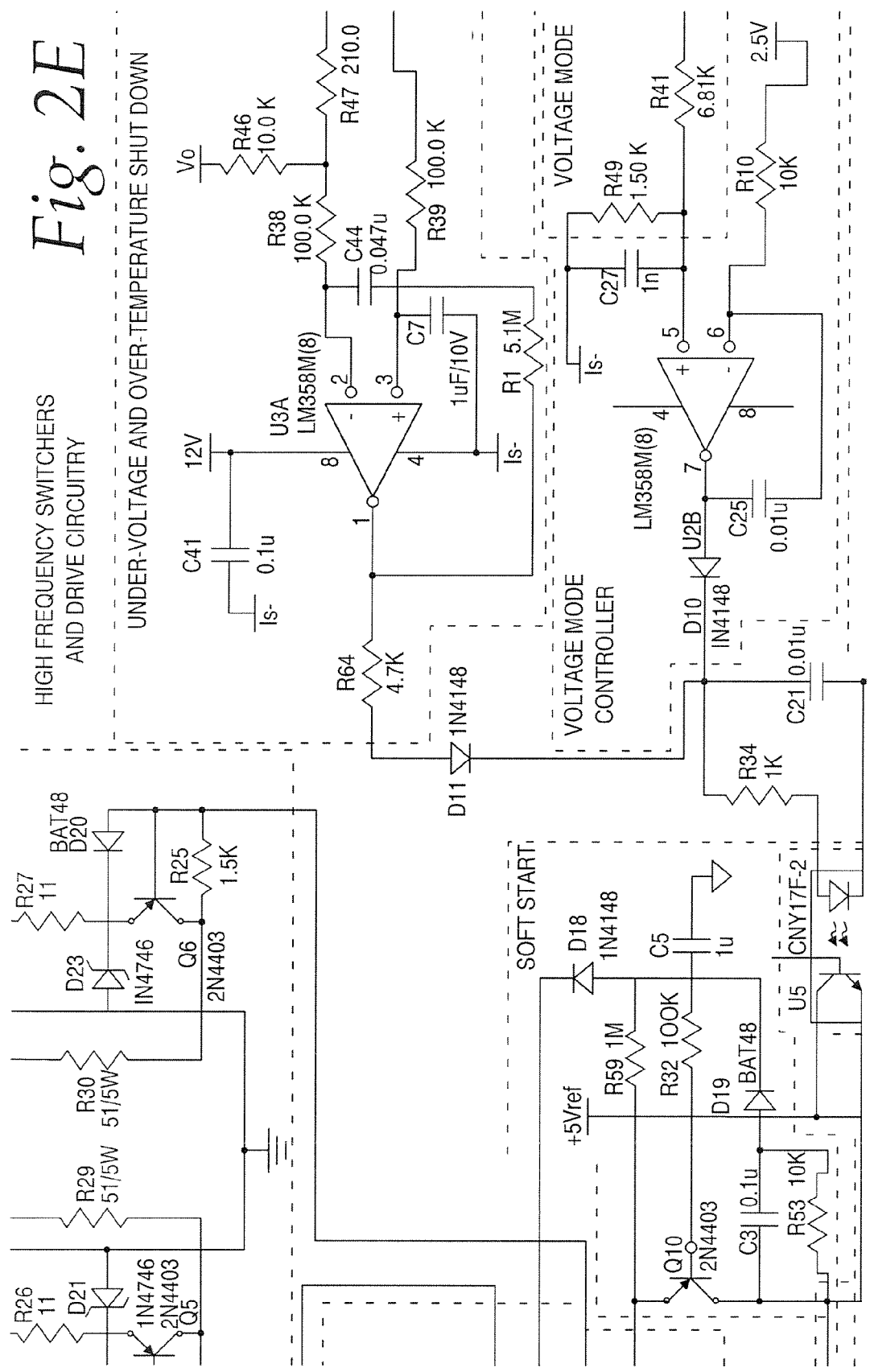
Figure 2F:
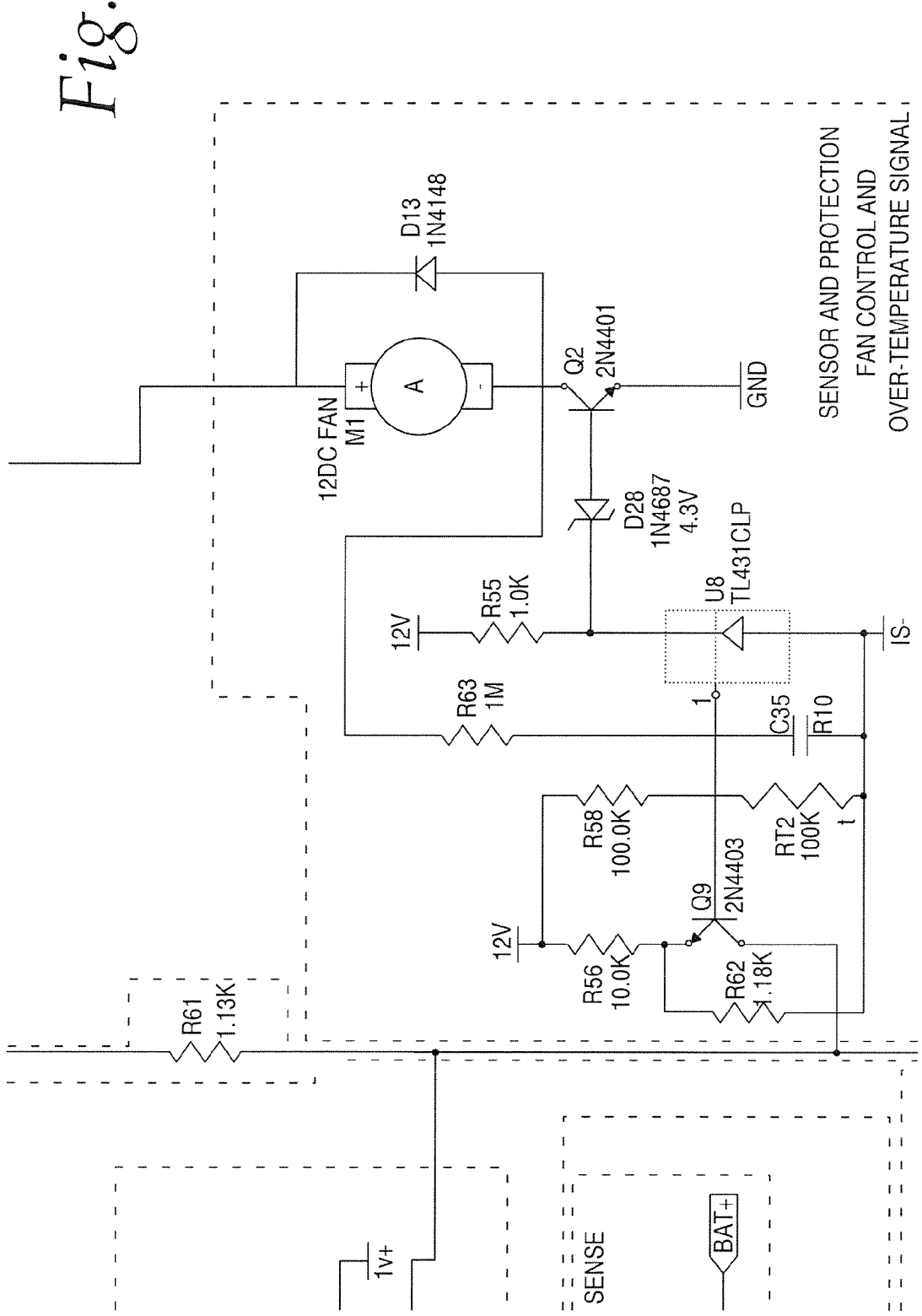
Figure 2G:
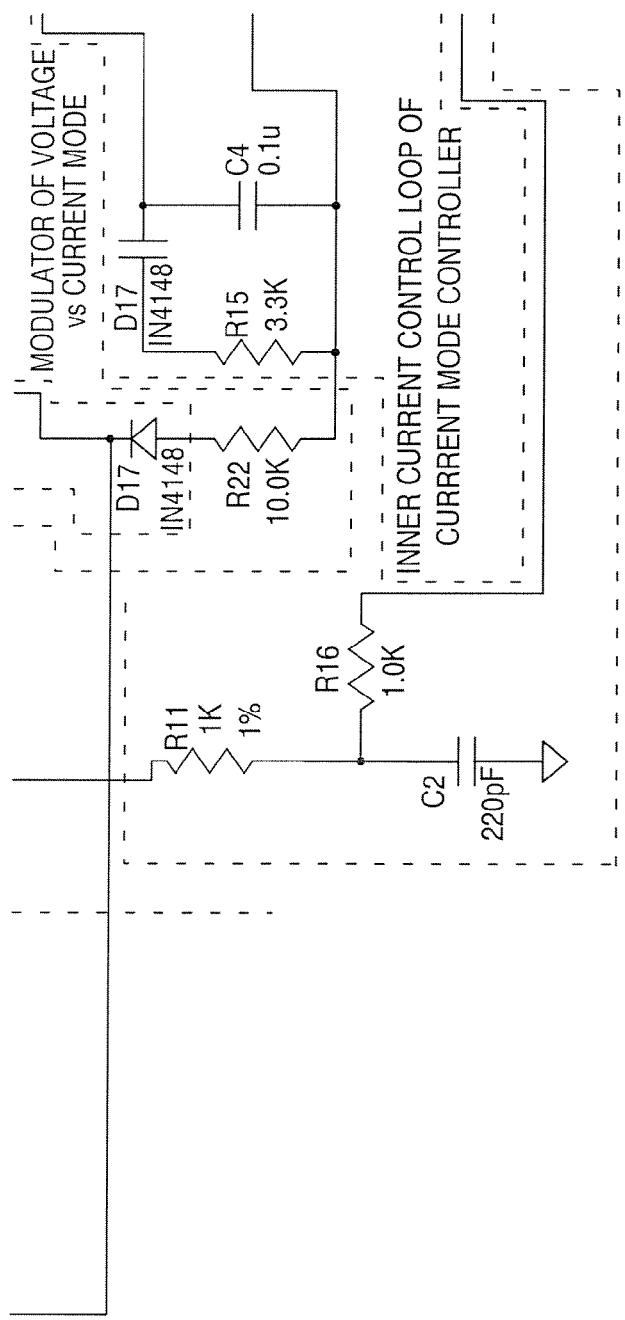
Figure 2H:
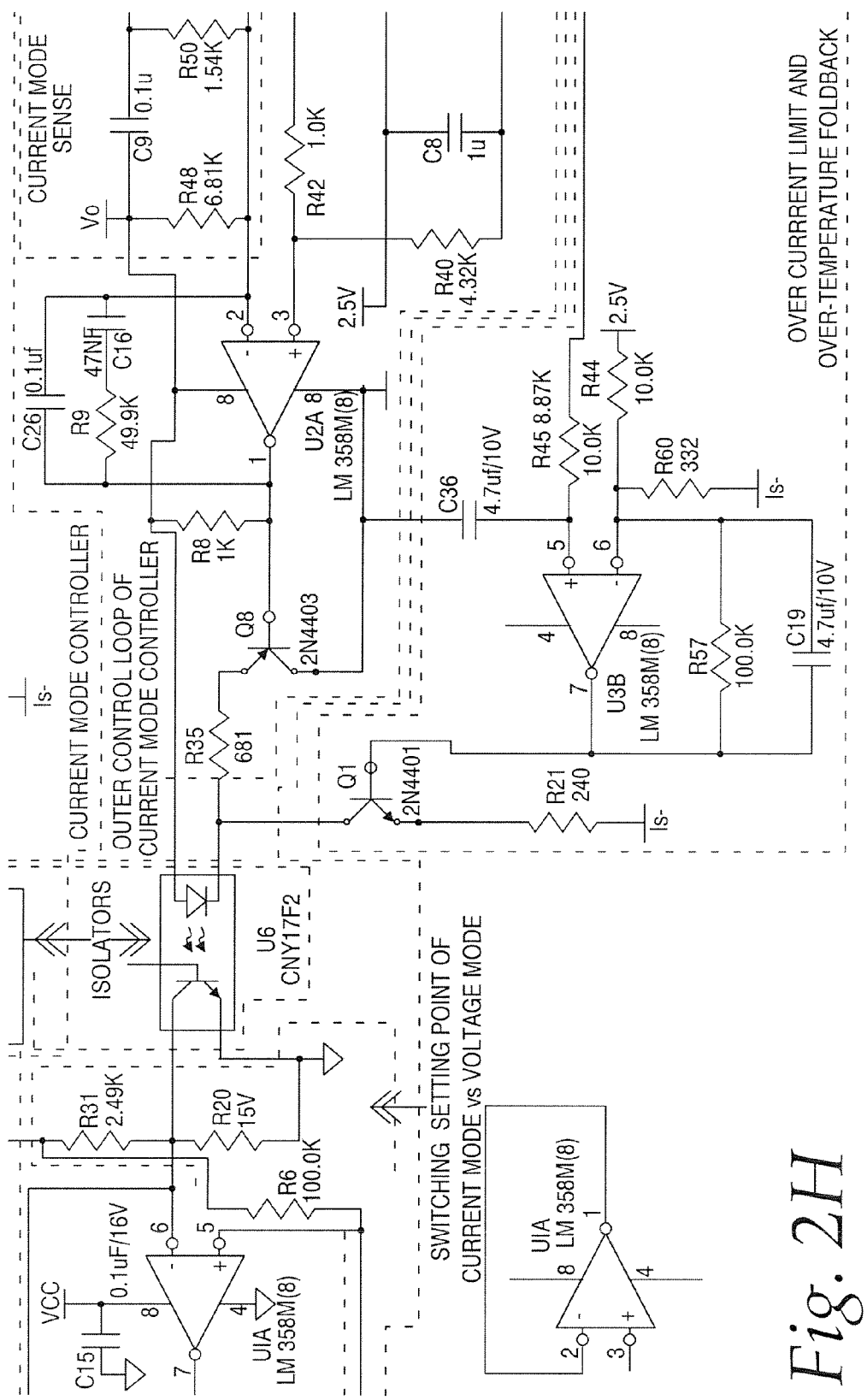
Figure 2I:
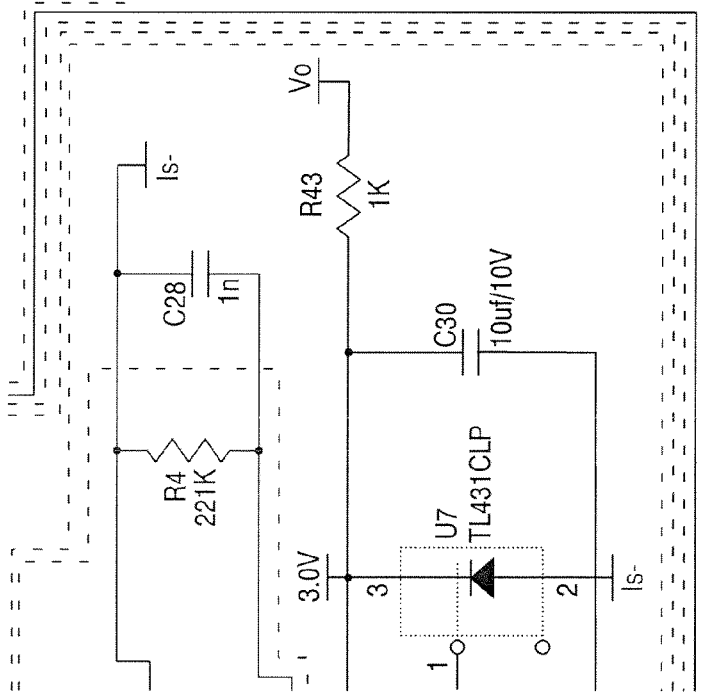

Referring to FIG. 1, the switched mode converter in accordance with the present invention is generally identified with the reference numeral 20. The switched mode converter 20 includes a power source 22, a high frequency transformer 24 and an output terminal 26. AC power sources are rectified by a rectifier 23. EMC filtering is also provided. The output of the high frequency transformer 24 is rectified and further filtered by an output rectification and output filter 25.

The high frequency transformer 24 is driven by a PWM controller 28 that is coupled thereto by way of a high frequency switching circuit 30. The switched mode converter 20 includes a multi-mode controller configured to operate the converter 20 in both a current controlled mode and a voltage controlled mode. In a voltage controlled mode, a first voltage sensor 32 monitors the output voltage of the converter 20. The output voltage from the first voltage sensor 32 is applied to a voltage mode controller 34 forming a voltage feedback loop. The voltage mode controller 34 is used to reduce the duty cycle of the output pulses of the PWM controller 28 when the output voltage of the converter 20 is greater than the voltage preset by the voltage sensor 32 and a reference voltage to provide regulation of the voltage at the converter output terminals 26.

A current mode controller 33 includes a second voltage sensor 36, an outer voltage controller 38, an optical coupler 42, an inner current controller 39, and a current feedback and switching point of voltage mode vs current mode device 48. The output voltage is sensed by a second voltage sensor 36 and applied to the outer voltage controller 38 forming a current setting for the inner current loop. The inner current controller 39 is also used to control the duty cycle of the output pulses from the PWM controller 28 by comparing the feedback current from a current sense circuit 46 with the current setting from the outer voltage controller 38.

Various sensors and protection circuitry, such as thermal, over-current and under-voltage protection, generally identified by the reference numerals 40 and 41, may be optionally applied to the voltage mode 34 and current mode 33 controllers. Additional sensors and features, such as a soft start circuit, generally identified with the reference numerals 50 and 51 can also be used to control the PWM controller 28 directly.

The voltage mode and current mode feed back loops from the voltage and current mode controllers 34 and 33, respectively, are applied to a mode switching device 44, either directly or alternatively by way of optical couplers 42. The mode switching device 44 switches the control of the PWM controller 28 between the voltage mode controller 34 and the current mode controller 33. The selection of voltage mode or current mode control is determined as a function of a predetermined current value sensed by the current sense circuitry 46 and the output of the outer voltage controller 38. To ensure current mode control taking place, the output voltage setting of the outer voltage controller 34 is set slightly lower than the output voltage setting of the voltage mode controller 34. As such, the voltage sensing point of outer voltage controller 34 is located closer to an output inductor than the voltage sensing point of the voltage mode controller 34. Accordingly, the voltage sensor 36 always senses a higher voltage than the voltage sensor 32, especially at high output current conditions. As such, when current mode controller 33 takes control, the output voltage becomes lower than when the voltage mode controller 34 is in control does, which ensures that the voltage mode controller 34 is effectively removed from the control loop of the converter 20. The mode switching device 44 decides which PWM control signals from the voltage mode controller 34 or the current mode controller 33 is connected to the PWM controller 28 by letting the higher voltage signal pass and blocking the lower voltage signal. In particular, when the load current is less than the predetermined value, for example, 3 amperes, the converter 20 operates in a voltage controlled mode. In this mode, the mode switching device 44 connects the feed back loop of the voltage mode controller 34 to the PWM controller 28. When the load current is at or greater than the predetermined value, the mode switching device 44 connects the feed back loop of the current mode controller 33 to the PWM controller 28.

With such a configuration, during a light load condition in which the converter 20 is voltage controlled, there is no need for a minimum load to stabilize the control loop. In a current-controlled mode, as the load increases to certain level, the current control loop will result in a relatively faster transient response and thus avoid flux imbalance in a converter with push-pull topology. As such, the converter 20 provides the advantages of both known voltage controlled and current controlled switched mode converters. An exemplary schematic diagram is illustrated in FIG. 2 for the switched mode converter illustrated in FIG. 1.

Exemplary Schematic

FIG. 2 is an exemplary schematic diagram of the switched mode converter 20 in accordance with the present invention. As mentioned above, two embodiments of the invention are contemplated; namely an AC to DC converter, as shown in FIGS. 1 and 2 and a DC to DC converter. A DC to DC converter operates in a similar manner but simply includes a DC power source, electrically coupled to the high frequency transformer T1 and would not include a bridge rectifier D1.

Referring to FIG. 2 the AC to DC converter 20 includes three (3) terminals L, N and an earth ground terminal G for receiving a three-wire 120 volt AC power supply. In order to protect the AC to DC converter 20 from power surges a varactor V1 may be connected across the L and N terminals. Electromagnetic interference (EMI) protection may also be provided. The EMI protection may be provided by an exemplary circuit, shown within the box 23. As shown, the EMI circuit 23 may include several capacitors CX1, CX2, CY1 and CY2, a pair of common mode chokes L1 and L2 and an inductance L3, configured as generally shown in FIG. 2. The EMI circuit 23 functions to filter electromagnetic noise from the power source 22.

The output of the EMI circuit 23 is connected to the input terminals 1 and 3 of the bridge rectifier D1 by way of a parallel resistor R2. A negative temperature coefficient thermistor RT1, may be connected between the EMI circuit 23 and one input leg of the bridge rectifier D15. The negative temperature coefficient thermistor RT1 limits the surge line current when the converter is power on.

Figure 3:
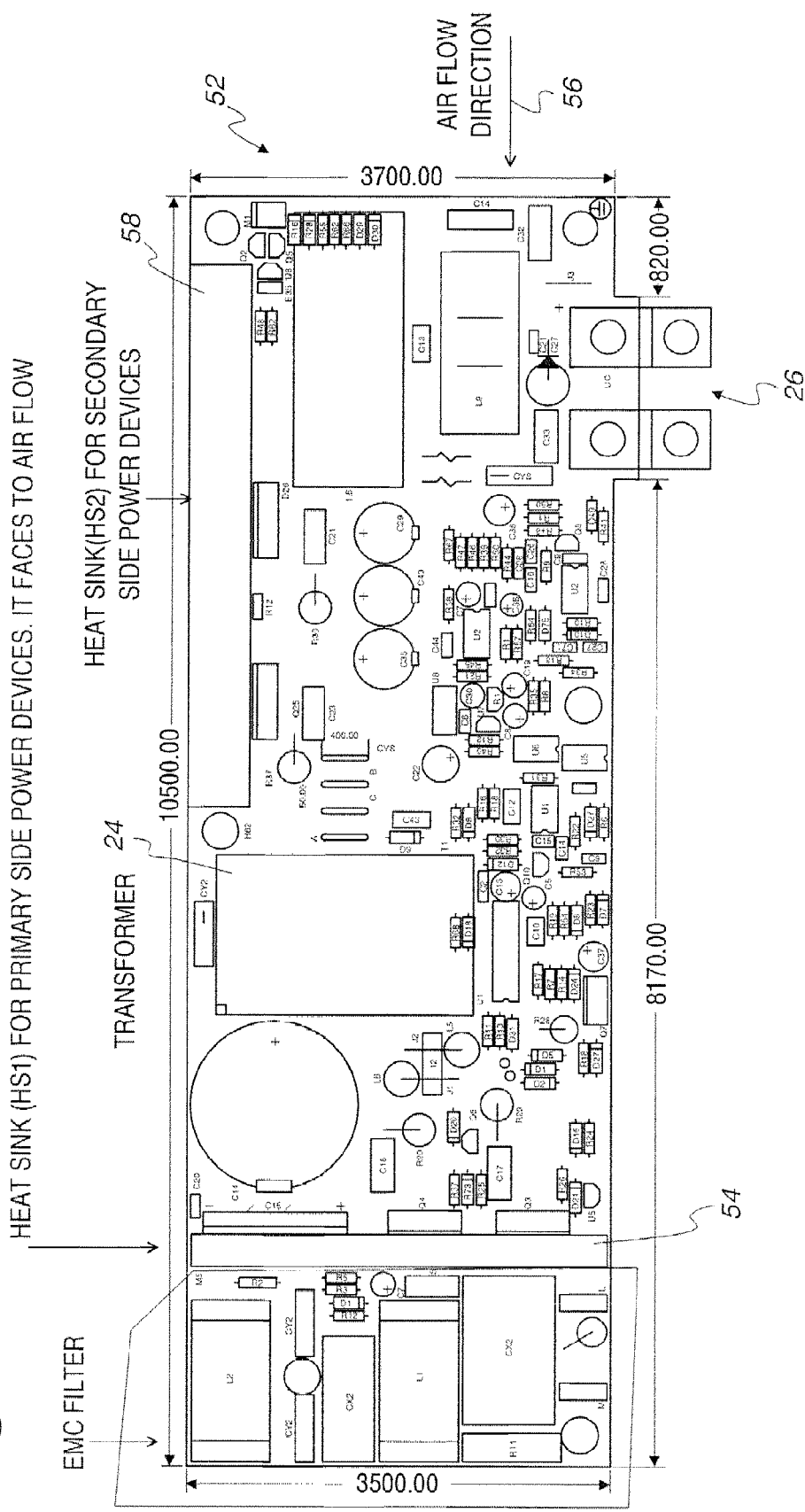
FIG. 3 is a top view of an exemplary power board for the switched mode converter illustrated in FIGS. 1 and 2, illustrating the EMC filter and primary and secondary side heat sinks.

The bridge rectifier D15 provides full wave rectification of the input AC power, connected to the converter input terminals L and N. The output terminals 2 and 4 of the bridge rectifier D15 are connected the high frequency transformer T1 and system ground, respectively. A capacitor C20 is used to reduce the EMI noise which radiates out from a primary heat sink HS1 (FIG. 3).

The exemplary high frequency transformer T1 is used to step down the rectified 170 volt output from the bridge rectifier to about 24 volts. As shown, the high frequency transformer T1 may include dual primary windings P1 and P2 and dual secondary windings S1 and S2, wound on a single core, configured, for example, as shown in FIG. 2. The primary winding P1 may be formed from 4 turns of 28 AWG copper. The primary winding P2 may be wound with 56 turns of dual 24 AWG copper wires in parallel and center tapped. The secondary winding S1 may be wound with 8 turns of 0.3 mm×8 mm copper foil and center tapped. Finally, the secondary winding S2 may be wound with 4 turns of 28 AWG copper wire.

One output terminal 2 of the bridge rectifier D15 is coupled to the center tap leg of the primary winding P2 by way of a fuse F2. The other output terminal 4 is connected to the primary circuitry ground. A filtering capacitor C14 may be connected between the output terminals 2 and 4 to smooth out the output voltage from the bridge rectifier D15. Both ending legs of the winding P2 are connected to the primary circuitry ground by way of a high frequency switching circuit, shown within the box 30. As will be discussed in more detail below, the high frequency switching circuit 30 switches the input voltage applied to the high frequency transformer T1 from the bridge rectifier D15. The battery terminals BAT+ and BAT− are coupled to the secondary winding S1 of the high frequency transformer T1 by way of an output rectification and an output filter circuit discussed below. For the exemplary turns ratios for the high frequency transformer T1 shown, the output voltage available at the secondary winding S1 is [120× 1.414 volts×(8/56)] about 24 volts DC.

The primary winding P1 provides a bias power source by way of a rectification diode D8 and a filtering capacitor C11. The start-up circuitry formed by R18, R28, Q2, D22, D7 and D24 provides a initial bias power to start the primary winding circuits, including those circuits identified within the boxes 30, 51, 28, 50 and 44, when the converter is powered on. After the converter 20 is started up, the primary winding P1 along with the rectification diode D8 and resistor R13 are used to supply the bias power for the primary circuitries instead of the start-up circuitry.

As mentioned above, the battery output terminals BAT+ and BAT− are connected to the secondary winding S1; specifically between the two ending legs of the secondary winding S1 and the center tap. The output rectification and output filter circuitry, shown within the box 25, includes two diode pairs D25 and D26, coupled to the respective legs of the secondary winding S1, which provide further rectification of the output voltage from the secondary winding S1. The capacitors C29, C39 and C40 and an inductor L8 form a LC filter for filtering the output signal from the secondary winding S1. The capacitor C23 and the resistor R37, as well as the capacitor C24 and the resistor R36 form snubbers to protect the rectification diode D25 and D26, respectively. The capacitors C13, C31, C32, C33, CY4 and CY5 along with the common mode choke L9 form a EMI filter. The diode D27 and the fuses F3 and F4 form a circuitry to protect the converter from damage by reverse polarities of a battery.

As mentioned above, the output voltage from the bridge rectifier D15 is connected to the center tap of the primary winding P2 of the high frequency transformer T1. Both ending legs of the of the primary winding P2 of the high frequency transformer T1, which forms the return path are coupled to system ground by way of the high frequency switchers and drive circuitry, shown within the box 30. The high frequency switcher circuitry applies the output voltage of the bridge rectifier D15 to the high frequency transformer T1 in the form of high frequency pulses under the control of a pulse width modulator (PWM) controller 28.

The high frequency switcher 30 includes a pair of identical switcher circuits connected to the two legs of the primary winding P2. As mentioned above, the output of the bridge rectifier D15 is connected to the center tap of the primary winding P2. The legs of the primary winding P2 form the return paths and are connected to primary ground. The switcher circuits 30 selectively connect the legs of the primary winding P2 to primary ground to form a return path under the control of the PWM controller 28. In particular, the top leg (i.e leg shown with the dot) of the winding P2 is connected to a first switcher which includes a MOSFET Q3, a transistor Q5, several resistors R24, R26 and R29, a capacitor C17, a diode D16, a Zener diode D21 and an inductor L4. The bottom leg of the primary winding P2 is connected to an identical switcher which includes a MOSFET 43 Q4, a transistor Q6, several resistors R25, R27 and R30, a capacitor C18, a diode D20, a Zener diode D23 and an inductor L7. Both switchers operate in the same manner and selectively connect the legs of the primary winding P2 to primary ground under the control of a PWM Controller 28. In particular, when the output voltages from the PWM controller U4 at pins E1 and E2, respectively, are low, the transistors Q5 and Q6 are on, and the transistors Q3 and Q4 are off, causing the legs of the primary winding P2 to be disconnected from the primary ground, thus interrupting the return path of the primary winding P2. When the voltage at pins E1 and E2 goes high, the transistors Q5 and Q6 turn off, thus the high voltages through D16 and R26, D20 and R27 causing the transistors Q3 and Q4 to turn on respectively, and connect the legs of the primary winding P2 to primary ground and complete the return path.

The resistors R24 and R25 act as biasing resistors for the transistors Q5 and Q6. The resistors R26 and R27 act as biasing resistors for the transistors Q3 and Q4, respectively. The diodes D16 and D20 turn off the transistors Q5 and Q6 when E1 and E2 of U4 are high. The Zener diodes D21 and D23 are used to limit the voltage across the gate and the source terminals of the transistors Q3 and Q4, also to limit the voltage across the base emitter terminals of the transistors Q5 and Q6.

The legs of the primary winding P2 are connected to the switchers by way of a transformer T2. In particular, the upper leg of the primary winding P2 is connected to one leg of one winding of the transformer T2. The other leg of the one winding of the transformer T2 is coupled to one switcher by way of a filter that includes a pair of serially coupled inductors L4 and L5, a capacitor C17 and a resistor R29. Similarly, the other r leg of the primary winding P2 is connected to one leg of another winding of the transformer T2. The other leg of the other winding of the transformer T2 is coupled to the other switcher by way of a filter that includes a pair of serially coupled inductors L6 and L7, a capacitor C18 and a resistor R30.

The PWM Controller 28 may be, for example, a Texas Instruments Model TL494 integrated circuit, as described in detail in publications entitled: "TL494 PULSE-WIDTH-MODULATION CONTROL CIRCUITS", publication no. SLVS074E, January 1983, revised February 2005, by Texas Instruments, "Designing Switching Voltage Regulators with the TL494", Application Report SLVA001D, December 2003, revised February 2005, by Texas Instruments, both available at www.ti.com, hereby incorporated by reference. The PWM controller 28, as implemented by the integrated circuit described above, is configured with two output transistors (not shown), each having a collector C1, C2 and an emitter E1, E2 terminal. As shown in FIG. 2, the collector pins C1 and C2 pins are coupled to the supply voltage Vcc and the emitter pins E1, E2 are used to control the switchers, described above.

A soft start circuit 50 may be provided which includes various resistors R32, R53 and R59, a transistor Q10, several capacitors C3 and C5 and a diode D19 and D18. The soft start circuit 50 allows the output pulse width at the PWM output to increase slowly during the power-on period, as such, reduces the voltage and current stress on the transistor Q3 and Q4.

The frequency of oscillation of the PWM Controller 28 is fixed by the circuitry attached to the oscillator pins RT and CT. In this case, the frequency of oscillation is set by the circuit which includes a resistor R19 and a capacitors C10. For the exemplary values indicated in FIG. 2, the oscillation frequency will be around 40 KHz.

The PWM Controller 28 integrated circuit includes two error amplifiers 1 and 2 and are brought out as pins 1 IN+ 1IN− and 2 IN+ 2 IN−. These error amplifiers may be used to control the output voltage and monitor input AC voltage, and can also be used to monitor the output current and provide current limiting to the load. The circuit that includes the resistor R3, R5 and R12, the diode D1 and the capacitor C1 is used to monitor the input AC voltage, and sends it to 1NI−, whenever the input AC voltage is less than a predetermined value, for example, 88 Vac, the error amplifier 1 will shut down the PWM. In other hand, when the input voltage is greater than a predetermined value, for example, 100 Vac, the output of the error amplifier 1 becomes low, then allows turning-on the PWM. This hysteresis for the AC line voltage is set by resistors R17 which one side is connected to the output of the amplifier in U4, and another side is connected to pin1 of U4, as such forming a positive feedback, therefore forming the hysteresis.

In accordance with an important aspect of the invention, the PWM Controller 28 is controlled in a voltage controlled mode under light load conditions by way of a voltage controller 34 and a current controlled mode under all other loading conditions by way of a current mode controller 33. The outputs of the voltage mode controller 34 and the current mode controller 33 are applied to a dead time control (DTC) pin, which controls the amount of off-time of the output pulse (i.e. duty cycle) of the output pulses of the PWM controller 28, available at pins E1 and E2 as a function of the voltage applied to the DTC pin. As discussed above, the output pins E1 and E2 are used to drive the switchers which, in turn, are used to control the connection and disconnection of the primary side of the high frequency transformer T1 in the circuit The output of the voltage mode controller 34 and the current mode controller are connected to a mode switching device, configured, for example, as a diode D17 and the transistor in the opto-coupler U5. In particular, the output signal of the voltage mode controller 34 is connected to the cathode of the diode D17. The output of the current mode controller 33 is connected to the anode of the diode D17 through the emitter of U5. As mentioned above, the mode is selected as a function of current load of the converter 20 and the output voltage. During light loading conditions, the output voltage of the voltage controller 34 will be greater than the output voltage of the current controller 33, thus causing the diode D17 to block the output signal from the current mode controller 33 and causing the output voltage of the voltage controller 34 to be coupled to the DTC pin. As will be discussed in more detail below, as the current loading increases, the output voltage of the current controller 33 exceeds the output voltage of the voltage controller 34 causing the diode D17 to conduct, thus causing the output voltage of the current controller 33 to be coupled to the DTC pin of the PWM controller 28 integrated circuit. During this condition, the voltage output of the voltage controller 34 floats since it is lower than the output voltage of the current mode controller 33.

The voltage mode controller 34 includes an amplifier U2B, for example a Fairchild Semiconductor LM 358 M, several capacitors C25 and C27 and several resistors R10, R41 and R49. The voltage mode controller 34 measures the voltage to the battery terminal BAT+ and compares it with a reference value, applied to the inverting input by way of the input resistor R10. The voltage to the battery is dropped across a voltage divider formed from the resistors R41 and R49. During light load conditions, for example, 3 amps or less, the output of the amplifier U1B in the current controller 33 will be low due to the load current less than the switching set point, as discussed in detail below, while the output of the amplifier U2B will be active. Its output is applied to the DTC pin of the PWM controller 28 by way of an opto-coupler U5. The output of the amplifier U2B is applied to the opto-coupler U5 by way of a diode D10, a current limiting resistor R34 and a voltage stabilizing capacitor C21. As mentioned above, the output of the coupler U5 is applied to the cathode of the diode D17 and the DTC pin of the PWM controller 28.

Under heavier current loading conditions, for example, loading conditions greater than 3 amps, the PWM controller 28 is current controlled under the control of a current mode controller 33. The current mode controller 33 includes an outer control loop 38 and an inner control loop 39. The outer voltage control loop 38 and the inner current control loop 39 are separated by an optical opto-coupler U6.

The outer voltage control loop 39 includes a difference amplifier U2A, several resistors R4, R8, R9, R35, R40, R42, R43, R48, R50, several capacitors C8, C9, C26, C28 and C30, a voltage reference U7 and a drive transistor Q8. As the load current of the converter 20 increases, the voltage of the inductor L8 will increase as a function of the rate of change of the load current through the inductor L8. This voltage is indicated as Vo. As the load current increases Vo will increase also. When Vo is greater than a predetermined value which is determined by resistors R4, R48 and R50, and the load current of converter 20 is greater than a value representative of 3 amps, for example, the output of the difference amplifier U2A will go low, causing the transistor Q8 to turn-on. Then, a control current is applied to the optical opto-coupler U6 by way of the resistors R8 and R35.

The output of the optical opto-coupler U6 is applied to the inner current control loop 39, whose output, in turn, is applied to the anode of the diode D17. The inner current control loop 39 includes an amplifier U1B, several resistors R15 and R22 and several capacitors C4, C12 and C15. In order to provide sufficient isolation between voltage mode set point and the current mode set point, the voltage set point of the inner current loop is set to be lower than the voltage set point for the voltage mode control. In particular, the output of the opto-coupler U6, applied to voltage divider which includes the resistors R6, R20 and R31. The minimum voltage across the resistor R20, which is decided by resistors R20, R31, voltage reference +5Vref and the saturation voltage of the transistor in U6, is the voltage set point for switching between a voltage mode and a current mode. The voltage switching point is compared with the primary switching current which represents the output load current of converter 20 and comes from the current sensing transformer T2 by way of the resistors R13, R11, R16, diodes D2, D3, D4, D6 and a capacitor C2. When the output of the optical opto-coupler U6 is high, indicative of a heavy current loading condition, the primary switching current will be high to match with the setting current. By careful selection of the components, the voltage at the anode of the diode D17 will be greater than the voltage from the voltage controller 34, applied to the cathode of the diode D17, thus turning on the diode D17 and connecting the inner current mode control loop to the DTC pin on the PWM Controller 28 integrated circuit, thus placing the PWM Controller 28 in a current control mode. There is a hysteresis between the voltage mode and the current mode by way of selecting the voltage drop across resistor R49 slightly lower than the voltage drop across resistor R4 and R50, so that when the output current of converter 20 is greater than, for example, 3 A, the converter 20 works at the current mode, when the output current of converter 20 is back to less than, for example, 2 A, the converter 20 will switch back to voltage mode. Thus avoiding the converter 20 jump in and back between the two modes when the output current is set at the switching point.

Optional under-voltage and over-temperature protection 41 may be provided. The under-voltage and over-temperature protection 41 includes a comparator U3A, several resistors R1, R38, R39, R46, R47 and R64, a diode D11 and several capacitors C7, C41 and C44.]. A current signal from the return path of the secondary side of the high frequency transformer T1 is sampled and dropped across a resistor R51 and R52, which function as current sense resistors The voltage across these resistor R51 and R52 is applied to pin3 of U3A through resistors R61 and R39, and compared with the voltage across R47 which is proportional to Vo divided by resistors R46 and R47. If the voltage across the resistor R51 and R52 is greater than the voltage across R47, the output of the comparator U3A goes high. When the comparator U3A is high, it forces the pulse width to be zero.

The circuitry for the over-temperature protection is formed by several resistors R56, R58 and R62, a transistor Q9, a thermistor RT2, a capacitor C35 and a voltage reference U8. When the temperature of secondary heat sink HS2 (FIG. 3) sensed by RT2 is higher than a predetermined value, for example, 80° C., transistor Q9 will turn on, causing the voltage of pin3 higher. Then it will follow the same principle as the over-current protection to force the pulse width of the PWM controller 28 to be zero The circuit may also include over-current limit and over temperature fold-back limiting control 40. The over-current limit and over temperature fold-back limiting control 40 includes a comparator U3B, a transistor Q1, several resistors R21, R44, R45, R57 and R60 and several capacitors C19, and C36 In this case, the voltage across the resistor R51 and R52 and the voltage from the collector of transistor Q9 are combined together at a resistor R61, and the combined voltage is applied to pin 5 of the amplifier U3B. If the combined voltage at pin 5 of the amplifier U3B is higher than the predetermined value decided by the voltage divider form by resistors R44 and R60, the output of the amplifier U3B becomes high, causing transistor Q1 turn-on, then reduce the current setting point at pin 6 of the amplifier U1B, reduce the pulse width of the PWM controller 28, so limit the output current to a predetermined value, for example 60 A, and meantime rolling down the output voltage.

Both ending terminals of primary winding P2 of transformer T1 go through the core of the current sensing transformer T2 in opposite directions, as such, the opposite flux densities created by the two currents from the both terminals of the primary winding P2 of T1 will be cancelled each other to avoid saturating the core of T2. The primary switching current in the winding P2 of T1 is proportional to the output current of converter 20. The primary switching current is sensed by T2, and is applied to the full waveform bridge rectifier form by diodes D2, D3, D4 and D6, and is converted to a voltage drop across resistor R13. Then this voltage drop across resistor R13 is applied to pin 5 of the amplifier U1B after it passes through a RC filter formed by a resistor R11 and a capacitor C2.

The sensors and protections circuitry 51 is formed by way of several resistors R65, R66 and R67, a thermistor RT3, and a transistor Q11. When the temperature of HS1 sensed by RT3 is higher than a predetermined value, for example, 80° C., transistor Q11 will turn on, causing the voltage of DTC of PWM controller 28 higher, then reduce the pulse width of the PWM controller 28, and cut back the output power of the converter 20.

The converter 20 may also be provided with a cooling fan for thermal management. The cooling fan M1 is connected to a 12 volt DC voltage regulator circuit which includes a voltage regulator U9, various capacitors C6, C22, C38 and C43, a diode D9. The input to the regulator circuit is connected to the secondary winding S2 of the high voltage transformer T1. The output of the regulator circuit is connected to the anode of a diode D29. The cathode of the diode D29 is connected to the + terminal of the fan motor. The + terminal of fan motor is also attached to the cathode of another diode D30 whose anode is attached to the positive DC rail. The cathodes of the diodes D29 and D30 are tied together. The configuration provides dual power supplies for the fan motor M1; one supply from the regulator circuit and one from the battery itself. The voltage regulator U9 also provides power for secondary control circuitry.

The negative terminal of the fan motor M1 is connected to ground by way of a transistor Q2. Drive circuitry is also provided for driving the transistor Q2. The drive circuitry includes various resistors R56, R58, R62, R63, a transistor Q9, a thermistor RT2 and an adjustable shunt regulator U8. The shunt voltage regulator works as a comparator, when the voltage drop across thermistor RT2 is higher than the reference voltage of U8, for example 2.5 Vdc, the voltage of pin3 of U8 is low, the fan is off. When the voltage drop across the thermistor RT2 due to high temperature sensed by RT2 is lower than the reference voltage of U8, the voltage of pin3 of U8 will become high, causing transistor Q2 turn-on, then turn on the fan. The resistor R63 is used to create a hysteretic-type ON-OFF control of the fan. The biasing circuit for the transistor Q9 is tied to the 12 volt output of the regulator U9 and as such prevents the transistor Q2 from connecting the − terminal of the fan motor to ground when the converter is disconnected from the AC power supply to prevent discharge of the battery during such a condition.

Thermal Design

In addition to the above, the EMC and thermal management of the converter 20 is addressed together in the design and implementation of the converter 20 to provide a reliable and cost-effective switched mode converter. In particular, by the careful arrangement of the locations of an EMC filter 23, a primary heat sink 54 for the primary side power components Q3, Q4 and D15 (FIG. 2), a secondary heat sink 58 for secondary side power components D25 and D26 (FIG. 2), a power transformer 24 and other secondary side power devices, such as L8, L9 and C29 (FIG. 2) as well as a cooling fan 68, a smaller EMC filter 23 can be used due to the primary heat sink 54 performing a dual function of thermal management and additionally providing EMC shielding to prevent the noise, for example, the noise generated by the transformer 24, from reaching the filter 23. In addition, the primary heat sink 54 is configured to face the air flow. A secondary heat sink 58 is also provided and placed close to the cooling fan 68 with its fin direction the same as the direction of the air flow 56. As such, both the primary and the secondary heat sinks 54 and 58, respectively get maximum air flow, allowing smaller heat sinks to be used in order to provide a reliable and cost-effective switched mode converter 20

FIG. 3 illustrates an exemplary power board layout for the switched mode converter illustrated in FIGS. 1 and 2. The power board, generally identified with the reference numeral 52, is configured with primary side power devices, such as the high frequency transformer 24, segregated from secondary side power devices. The primary side power devices refer to the high frequency transformer 24 and devices connected to the primary side. The secondary side power devices refer to devices connected to the secondary side of the high frequency transformer 24. The EMC filter 23 performs noise filtering function so that the converter 20 will comply with known EMC standards. As shown, a primary heat sink 54 is used to segregate the EMC filter from the balance of the primary side power devices, the transformer and the secondary circuitry, which all generate high frequency noise. As such, the primary heat sink 54 is configured to additionally provide EMC shielding to reduce EMC noise. As shown, the primary heat sink 54 is disposed on the power board 52 so that the longitudinal axis of the heat sink 54 is generally perpendicular to the direction of air flow, as indicated by the arrow 56. Optional holes 59 (FIG. 7B) may be provided in the primary heat sink 54 to allow the air flow to pass through it and transfer heat away from it. By segregating the EMC filter 23 from the balance of the primary side power devices, the primary heat sink 54 can be located fairly closely to the primary side power devices which generate the greatest amount of heat and get maximum air flow.

A secondary heat sink 58 is provided for the secondary side power components. As shown in FIG. 3, the secondary heat sink 58 is located close to the cooling fan 68 along one edge of the power board 52 so as not to interfere with the air flow across the entire power board 52 in the direction of the arrow 56. The secondary heat sink 58 is disposed such that its longitudinal axis 58 is generally parallel to the direction of air flow 56 and perpendicular to the longitudinal axis of the primary heat sink 54.

The primary heat sink 54 may be configured such that it spans the width of the power board 52. The primary heat sink 54 is disposed such that its longitudinal axis is generally perpendicular to a longitudinal axis of the power board 52. An exemplary configuration for the primary heat sink 54 is illustrated in FIGS. 7A and 7B.

Figure 8B:
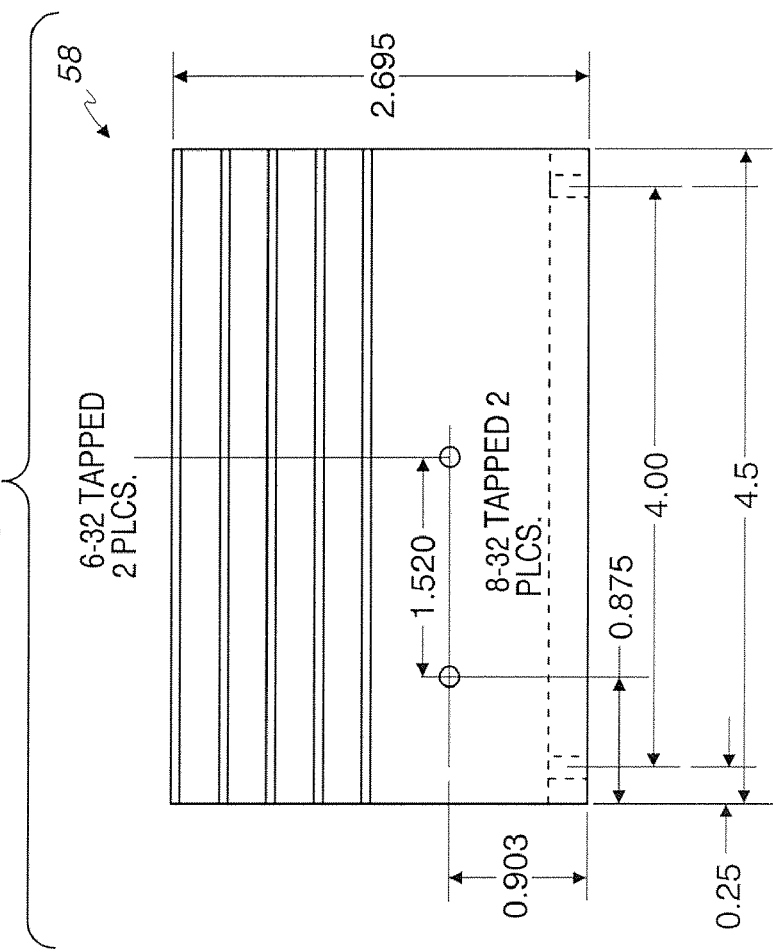
FIG. 8B is a side elevational view of the secondary heat sink illustrated in FIG. 8A.
Figure 8A:
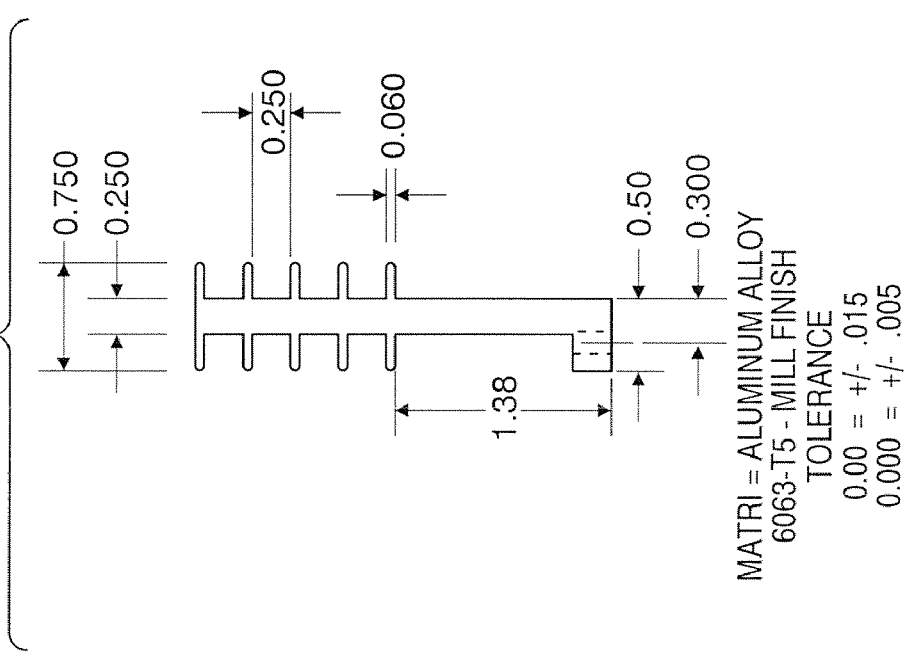
FIG. 8A is a front elevational view of an exemplary secondary heat sink for use with the present invention.

The secondary heat sink 58 is configured to span the length of that section of the power board 52 which carries secondary side components. The secondary heat sink 58 is configured such that its longitudinal axis is generally parallel to the longitudinal axis of the power board 52. An exemplary configuration for the secondary heat sink 58 is illustrated in FIGS. 8A and 8B.

Figure 4:
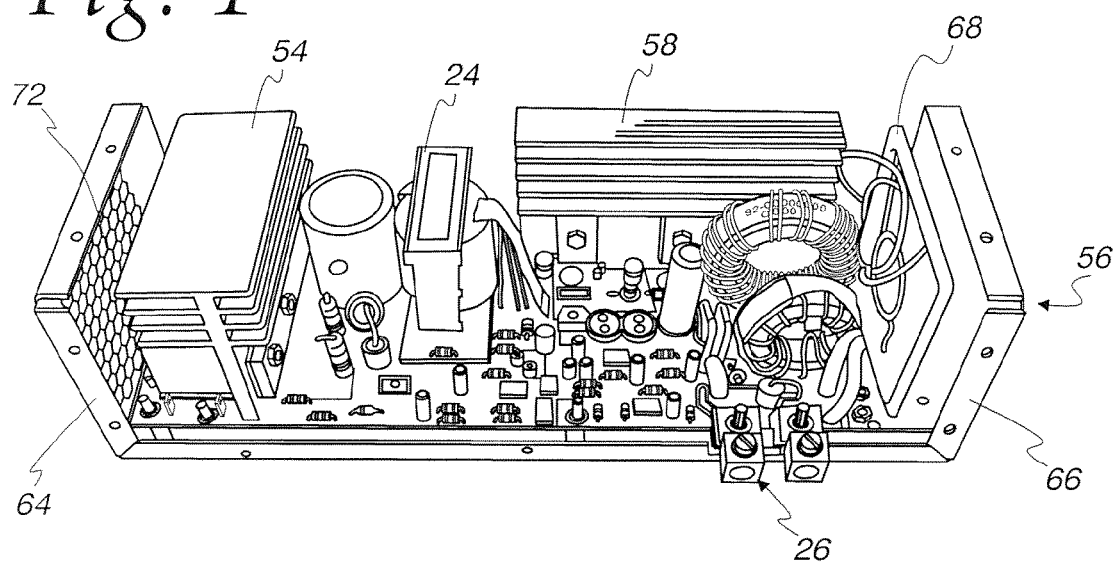
FIG. 4 is a front isometric view of the power board illustrated in FIG. 3, shown mounted on a chassis.
Figure 5:
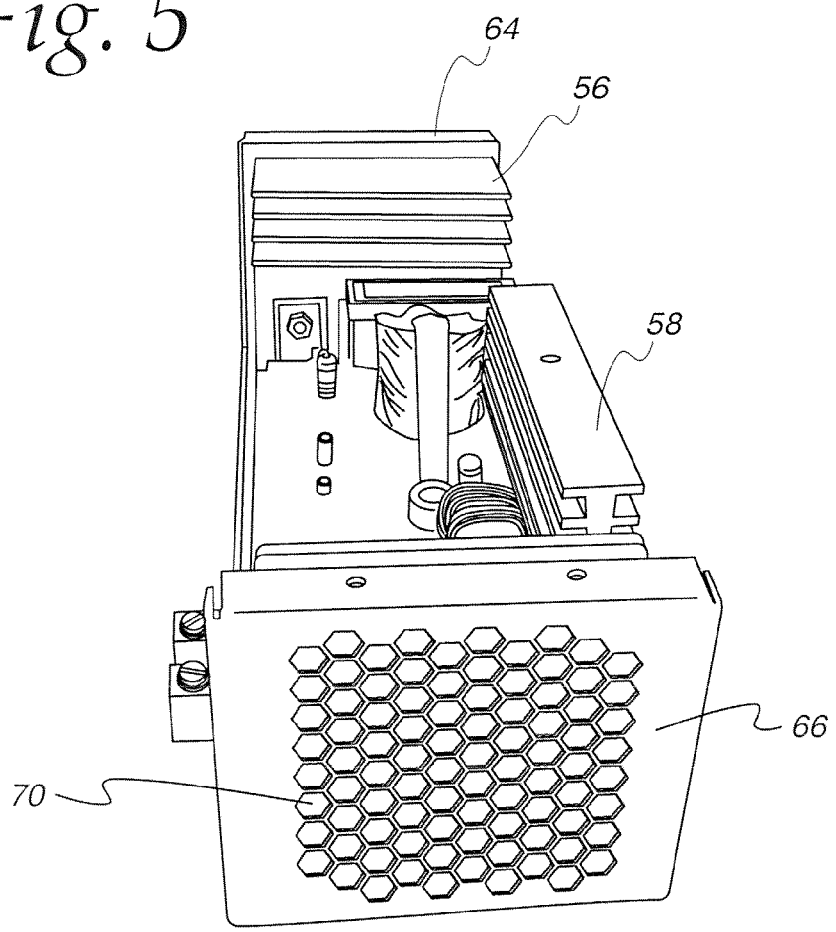
FIG. 5 is similar to FIG. 4 but illustrating a side isometric view.

Turning to FIGS. 4 and 5, the power board 52 is shown mounted to a chassis 60. The chassis 60 is formed with a base 62 and spaced apart sidewalls 64 and 66. A cooling fan 68 is optionally disposed adjacent one sidewall 66. The cooling fan 68 is oriented to cause air flow in the direction of the arrow 56. As shown best in FIG. 5, the sidewall 66 is formed with a plurality of apertures 70 and thus acts as an intake for the fan 66. Similarly, as best shown in FIG. 4, the sidewall 64 is also formed with a plurality of apertures 72 to enable the air flow caused by the fan 68 to exhaust to the outside.

As mentioned above, the converter 20 is provided with a pair of outlet terminals 26. These outlet terminals 26 are spaced away from the chassis 60 and are used to connect external DC loads to the converter 20.

Housing

Figure 6B:
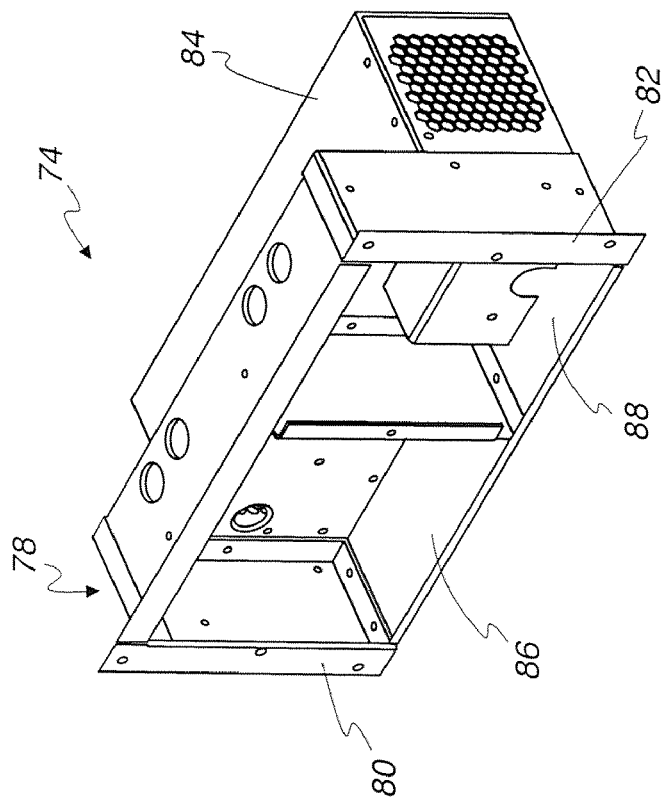
FIG. 6B is similar to FIG. 6A, but shown with the cover removed.
Figure 6A:
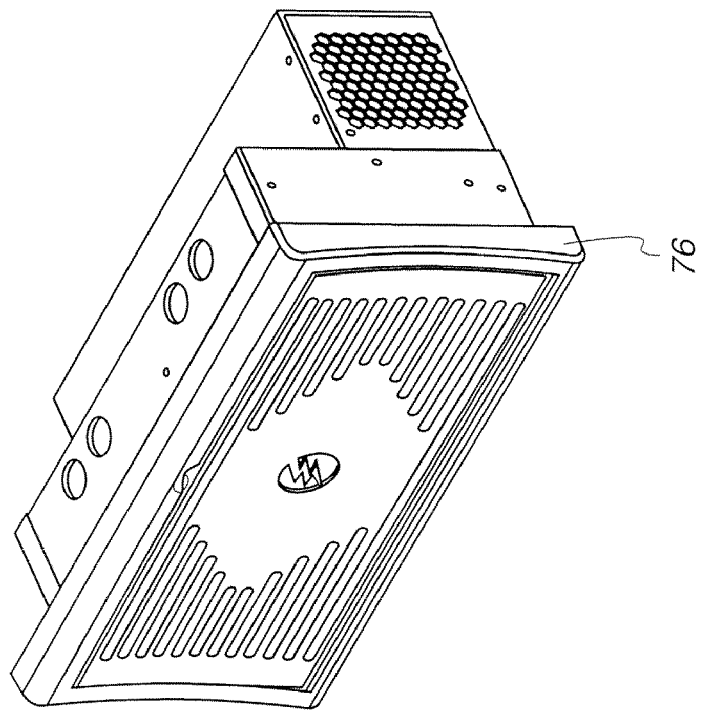
FIG. 6A is a front isometric view of an exemplary housing for the power board and chassis illustrated in FIGS. 4 and 5, shown with an exemplary cover attached.

An exemplary housing 74 for the chassis 60 and power board 52. The housing 74 is configured to allow the converter be mounted in a recreational vehicle (RV), for example, as disclosed in U.S. Pat. No. 5,600,550, hereby incorporated by reference. The housing 74 is configured to be mounted flush with an exterior wall of an RV (not shown) and includes an exterior removable cover 76. The housing 74 includes a rectangular housing portion 78, formed with a pair of spaced apart vertical flanges 80 and 82. The dimensions of the rectangular housing portion 78 are selected to enable the rectangular housing portion 78 to be received in an opening (not shown) in an exterior wall of an RV. The spaced apart vertical flanges 80 and 82 enable the housing to be secured to the exterior wall of the RV. As shown in FIGS. 6A and 6B, the sidewalls 64 and 66 of the chassis 60 are secured to the backside of the rectangular housing portion 78 and covered with a cover 84, secured thereto.

As shown in FIG. 6B, the rectangular housing portion 78 defines a pair of cavities 86 and 88. When the housing 74 is installed to an exterior wall of an RV, the cavities 86 and 88 will be accessible from the outside of the RV. The cavity 86 may be used for an AC power cord, for example a 220V/120V power cord used to connect the converter 20 to an external source of AC. The cavity 86 may also be used for mounting AC circuit broker blocks. The cavity 88 may be used a junction box for connecting the various DC loads to enable them to be connected to the output terminals 26 (FIGS. 3 and 4).

The cover 76 is used to close the cavities 86 and 88. Many conventional methods may be used to secure the cover 76 to the rectangular housing portion including fasteners, a snap fit and others.

Obviously, many modifications and variations of the present invention are possible in light of the above teachings. Thus, it is to be understood that, within the scope of the appended claims, the invention may be practiced otherwise than is specifically described above.

What is claimed and desired to be secured by Letters Patent of the United States is:

1. A switched mode converter comprising:
   a high frequency transformer;
   a high frequency switching circuit for selectively connecting an external power source to said high frequency transformer;
   a pulse width modulator (PWM) for controlling said high frequency switching circuit;
   a voltage mode controller for selectively controlling said PWM;
   a current mode controller for selectively controlling said PWM;
   a mode switching device for selectively coupling said voltage mode controller and said current mode controller to said PWM.

\* \* \* \* \*